United States Patent [19]
Livesey et al.
[11] Patent Number: 4,894,747
[45] Date of Patent: Jan. 16, 1990

[54] SIDE PLATE TAPERED TWIST TAB FASTENING DEVICE FOR FASTENING SIDE PLATES TO THE BASE

[75] Inventors: John K. Livesey, Carnegie; Alfred E. Maier, Beaver Falls, both of Pa.
[73] Assignee: Westinghouse Electric Corp., Pittsburgh, Pa.

[21] Appl. No.: 256,880
[22] Filed: Oct. 12, 1988
[51] Int. Cl.$^4$ ........................ H02B 1/04
[52] U.S. Cl. ........................ 361/376; 335/16; 411/531
[58] Field of Search ........................ 361/376; 335/16; 411/531

[56] References Cited

U.S. PATENT DOCUMENTS 3,125,190 3/1964 Brennan ........................ 411/531 X
3,976,307 8/1976 Ogisu ........................ 411/531 X
4,191,872 3/1980 Sorenson ........................ 411/531 X
4,489,295 12/1984 Altenhof, Jr. et al. ........................ 335/20
4,638,277 1/1987 Thomas et al. ........................ 335/190
4,642,431 2/1987 Tedesco et al. ........................ 335/16 X
4,656,444 4/1987 McKee et al. ........................ 335/16
4,679,018 7/1987 McKee et al. ........................ 335/167

*Primary Examiner*—Roy N. Envall, Jr.
*Attorney, Agent, or Firm*—M. J. Moran

[57] ABSTRACT

A molded case circuit breaker is provided with side plates having twist tabs extending downwardly from a bottom edge for fastening the side plates to the circuit breaker base. Spin plates with slots are carried by the base for receiving the twist tabs. The twist tabs are formed with a shank portion, a tapered portion and a head portion. The tapered portion defines a sloped surface which contacts the slot in the spin plate. When the twist tab is twisted, the shank is shortened drawing a wider portion of the sloped surface into the engagement with the slot to secure the side plate to the base.

11 Claims, 5 Drawing Sheets

Fig-1
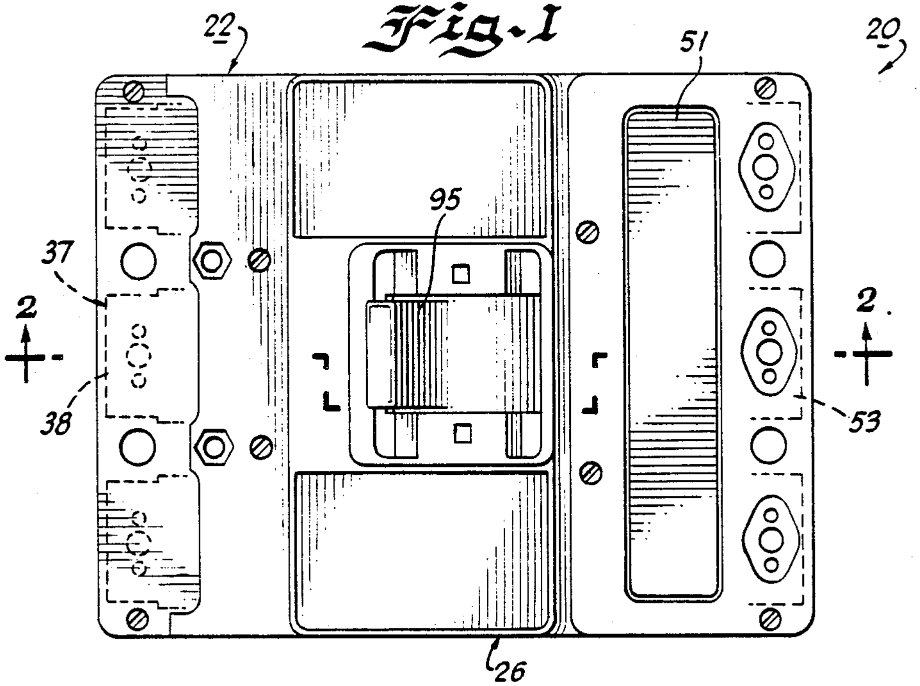
Fig-16
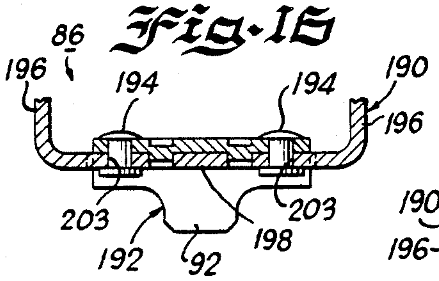
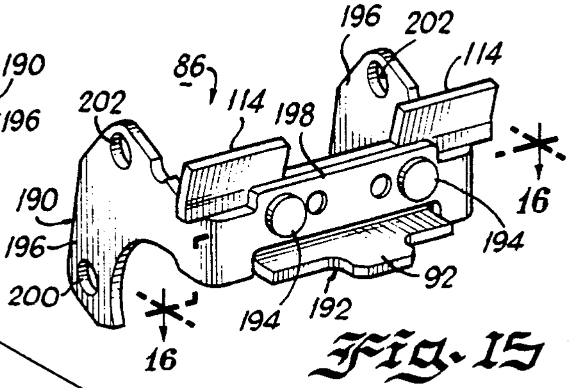
Fig-15
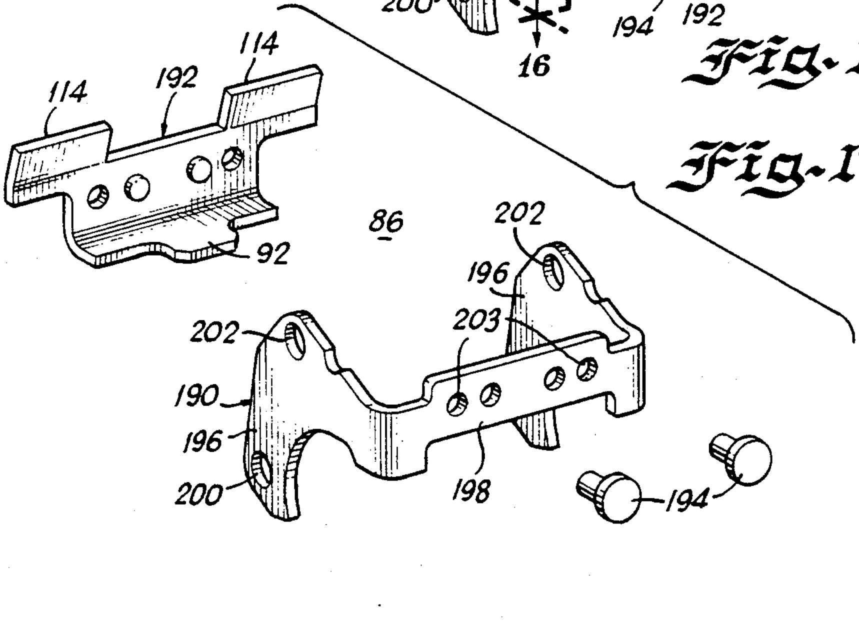
Fig-17

20

SIDE PLATE TAPERED TWIST TAB FASTENING DEVICE FOR FASTENING SIDE PLATES TO THE BASE

CROSS REFERENCE TO RELATED APPLICATIONS

This application is related to the following copending applications, all filed on Oct. 12, 1988 Ser. No. 07/256,881, entitled SCREW ADJUSTABLE CLINCH JOINT WITH BOSSES, by James N. Altenhof, Ronald W. Crookston, Walter V. Bratkowski, and J. Warren Barkell, Westinghouse Case No. WE 54,694; Ser. No. 07/256,879, entitled TAPERED STATIONARY CONTACT-LINE COPPER, by Ronald W. Crookston, Westinghouse Case No. WE 54,695; and Ser. No. 07/256,878, entitled TWO PIECE CRADLE LATCH FOR CIRCUIT BREAKER by Albert E. Maier and William G. Eberts, Westinghouse Case No. WE 54,870.

This case is also related to the following copending applications, all filed on Aug. 1, 1988: Ser. No. 226,500, entitled RUBBER STOPS IN OUTSIDE POLES by William E. Beatty, Jr., Lawrence J. Kapples, Lance Gula and Joseph F. Changle, Westinghouse Case No. WE 54,532; Ser. No. 226,648, entitled CT QUICK CHANGE ASSEMBLY, by Jere L. McKee, William E. Beatty, Jr. and Glenn R. Thomas, Westinghouse Case No. WE 54,533; Ser. No. 226,503, entitled CROSSBAR ASSEMBLY, by Jere L. McKee, Lance Gula and Glenn R. Thomas, Westinghouse Case No. 54,579; Ser. No. 226,649, entitled LAMINATED COPPER ASSEMBLY, by Charles R. Paton, Westinghouse Case No. WE 54,580; Ser. No. 226,650, entitled CAM ROLL PIN ASSEMBLY, by Lance Gula and Jere L. McKee, Westinghouse Case No. WE 54,594; Ser. No. 226,655, entitled COMBINATION BARRIER AND AUXILIARY CT BOARD, by Gregg Nissly, Allen B. Shimp and Lance Gula, Westinghouse Case No. WE 54,821 and Ser. No. 226,654, entitled MODULAR OPTION DECK ASSEMBLY, by Andrew J. Male, Westinghouse Case No. WE 54,822.

Lastly, this case is related to copending application Serial No. 07/260,848, filed on Oct. 21, 1988, entitled UNRIVETED UPPER LINK SECUREMENT, by Joseph F. Changle and Lance Gula, Westinghouse Case No. WE 54,713.

BACKGROUND OF THE INVENTION

1. Field of the Invention

This invention relates to molded case circuit breakers and more particularly to a side plate, used with the circuit breaker operating mechanism, having twist tabs extending downwardly from the bottom edge for connecting the side plates to the circuit breaker base.

2. Description of the Prior Art

Molded case circuit breakers are generally old and well known in the art. Examples of such circuit breakers are disclosed in U.S. Pat. Nos. 4,489,295; 4,638,277; 4,656,444 and 4,679,018. Such circuit breakers are used to protect electrical circuitry from damage due to an overcurrent condition, such as an overload and relatively high level short circuit condition. An overload condition is normally about 200-300 percent of the nominal current rating of the circuit breaker. A high level short circuit condition can be 1000 percent or more of the nominal current rating of the circuit breaker.

Molded case circuit breakers include at least one pair of separable contacts which may be operated either manually by way of a handle disposed on the outside of the case or automatically in response to an overcurrent condition. In the automatic mode of operation, the contacts may be opened by an operating mechanism, controlled by an electronic trip unit, or by magnetic repulsion forces generated between the stationary and movable contacts during relatively high levels of overcurrent.

In one automatic mode of operation, the contact assemblies for all poles are tripped together by an electronic trip unit and a mechanical operating mechanism. More particularly, the electronic trip unit is provided with current sensors to sense an overcurrent condition. When an overcurrent condition is sensed, the current transformers provide a signal to the electronic circuitry within the electronic trip unit to actuate the operating mechanism to cause the main contacts to be separated.

In the other automatic mode of operation, the contact arm assemblies are disengaged from the mechanical operating mechanism and are blown open by magnetic repulsion forces. More particularly, magnetic repulsion members or shunts are used to allow the contact arm, which carries the movable main contact, to pivot. Each magnetic repulsion member is generally V-shaped defining two legs. During relatively high level overcurrent conditions, magnetic repulsion forces are generated between the legs of the magnetic repulsion member as a result of current flowing through the legs in opposite directions. At a relatively high level overcurrent condition, these magnetic repulsion forces cause the contact arm carrying the movable main contact to be blown open.

During a blow open condition, each contact arm is operated independently of the mechanical operating mechanism. For example, for a three phase circuit breaker having a high level overcurrent on the A phase; only the A phase contact arm will be blown open by its respective repulsion member. The contact arms for the B and C phases would remain closed and thus are unaffected by the operation of the A phase. The contact arms for the B and C phases are tripped by the electronic trip unit and the operating mechanism. This is done to prevent a condition known as single phasing, which can occur for circuit breakers connected to rotational loads, such as motors. In such a situation, unless all phases are tripped, the motor may act as a generator and contribute to the overcurrent condition.

The operating mechanism for the circuit is disposed adjacent the center pole. Side plates are used to pivotally support several components of the operating mechanism, such as the crossbar. The side plates must be connected to the circuit breaker base very securely in order to avoid affecting the proper operation of the operating mechanism. In known breakers, the side plates are connected to the base of the circuit breaker by various means, such as tabs with threaded ends, spun over ends or stakes received in load bearing plates carried by the circuit breaker base.

In other known circuit breakers, side plates having downwardly extending tabs with straight shank portions and enlarged head portions are provided. These tabs are received in slots disposed in spin plates, carried in the underside of the base. The twist tabs are twisted to secure the side plates to the base. In this design, it is necessary to control the length of the shank in order to avoid play in the side plates after the twist tabs are twisted to avoid affecting operation of the operating mechanism.

SUMMARY OF THE INVENTION

It is an object of the present invention to provide a side plate with twist tabs which overcomes the problems associated with the prior art.

It is a further object of the present invention to provide means for securely fastening the side plates to the circuit breaker base.

Briefly, the present invention relates to a molded case circuit breaker having side plates with twist tabs extending downwardly from a bottom edge for fastening the side plates to the circuit breaker base. Spin plates with slots are carried by the base for receiving the twist tabs. The twist tabs are formed with a shank portion, a tapered portion defining a sloped surface and a head portion. The sloped surfaces engage the slot in the spin plate. When the twist tab is twisted, the shank is shortened drawing a wider portion of the sloped surface into the engagement with the slot to secure the side plates to the base.

DESCRIPTION OF THE DRAWING

These and other objects and advantages of the present invention will become readily apparent upon consideration of the following detailed description and attached drawing wherein:

FIG. 1 is a top elevational view of the circuit breaker in accordance with the present invention;

FIG. 15 is a perspective view of the cradle assembly in accordance with the present invention;

FIG. 16 is a cross-sectional view taken along line 16—16 of FIG. 15; and

FIG. 17 an exploded perspective view of the components of the cradle assembly.

DETAILED DESCRIPTION

Figure 2:
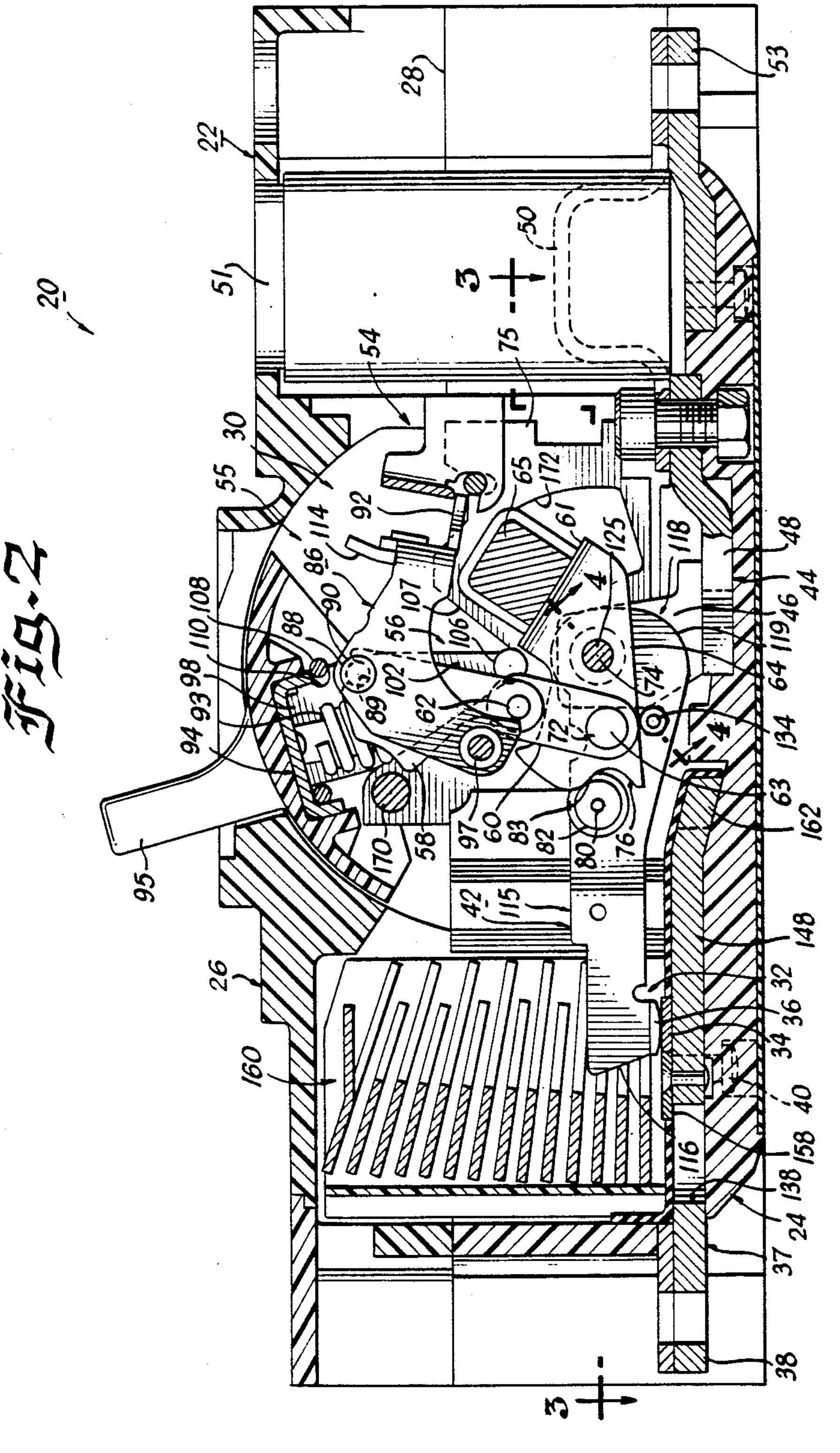
FIG. 2 is a cross-sectional view taken substantially along line 2—2 of FIG. 1.
Figure 3:
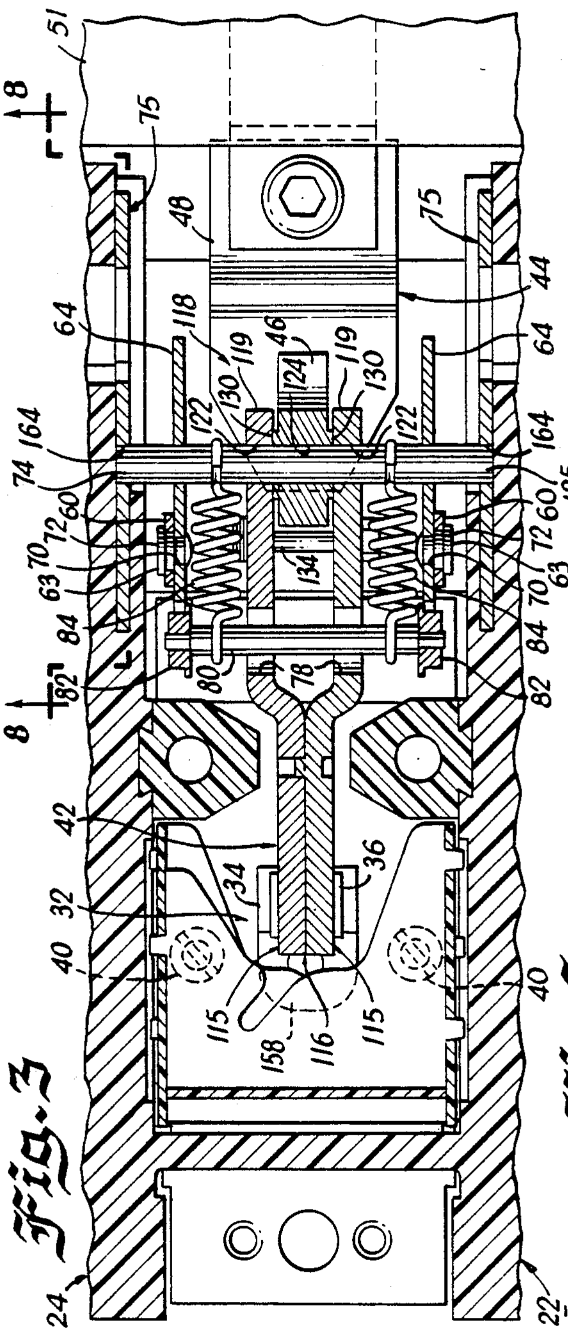
FIG. 3 is a plan sectional view taken along line 3—3 of FIG. 2.
Figure 7:
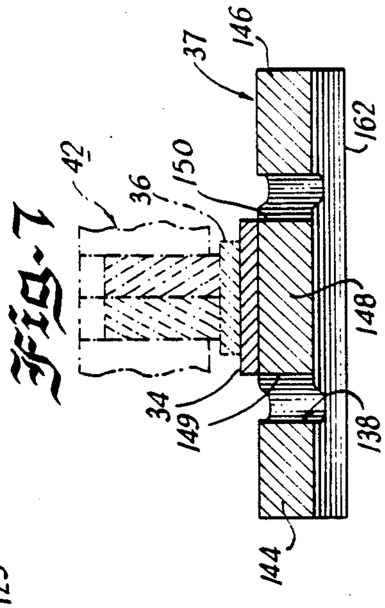
FIG. 7 is an enlarged cross-sectional view taken along line 7—7 of FIG. 6 with the contact arms shown in dot-dash lines.

A molded case circuit breaker, generally indicated by the reference numeral 20, comprises an electrically insulated housing 22 having a molded base 24 and a molded coextensive cover 26, assembled at a parting line 28. The internal cavity of the molded base 24 is formed as a frame 30 for carrying the various components of the circuit breaker. As illustrated and described herein, a Westinghouse Series C, L-frame molded case circuit breaker will be described. However, it should be understood that the principles of the present invention are applicable to various types of molded case circuit breakers.

At least one pair of separable main contacts 32 are carried by the frame 30. More specific ally, the pair of main contacts 32 include a rigidly mounted main contact 34 and a movably mounted main contact 36. The rigidly mounted main contact 34 is mounted to a line side conductor 37 having a line side terminal portion 38 at one end. The line side terminal portion 38 extends outwardly from the housing 22 to permit connection with an external electrical circuit. The line side conductor 37 is attached to the frame 30 with a plurality of fasteners 40.

The movable main contact 36 is carried by a contact arm 42. As will be discussed in more detail below, the contact arm 42 is pivotally connected to a load conductor assembly 44. The load conductor assembly 44 includes a pivot bracket 46, rigidly connected to a load conductor base 48. The load conductor base 48 is rigidly mounted to the frame 30 and electrically connected to a U-shaped load conductor 50. The U-shaped load conductor 50 forms a portion of an electronic trip unit 51. One end of the U-shaped conductor 50 is secured to the frame 30 and the load conductor base 48. The other end of the U-shaped conductor 50 is electrically connected to a load side terminal 53 to allow connection to an external electrical circuit.

The electronic trip unit 51 contains one or more internal current sensors for detecting current flowing through the main contacts 32. The electronic trip unit 51 also includes a latch mechanism 54. The latch mechanism 54 is interlocked with an operating mechanism 55 of the circuit breaker 20. Upon detection of an overcurrent condition, the electronic trip unit 51 operates the latch mechanism 54 to unlatch the circuit breaker operating mechanism 55 to allow the main contacts 32 to be separated. The electronic trip unit 51 also contains a pushbutton (not shown) which allows the circuit breaker 20 to be tripped by depressing the button. The electronic trip unit 51 does not form a part of the present invention.

OPERATING MECHANISM

An operating mechanism 55 is provided for opening and closing the main contacts 32. The operating mechanism includes a toggle assembly 56, which includes a pair of upper toggle links 58 and a pair of lower toggle links 60. Each upper toggle link 58 is pivotally connected at one end to a lower toggle link 60 about a pivot axis 62. The other end of the lower toggle links 60 is pivotally connected about a pivot axis 63 to a U-shaped bracket 61, having depending operating arms 64. More specifically, apertures 70, provided in the operating arms 64, receive a pin 72 forming a pivotal connection between the lower toggle links 60 and the operating arms 64 about the pivot axis 63. The U-shaped bracket 61 is rigidly connected to a crossbar 65. The operating arms 64 are disposed adjacent each side of the contact arms 42 and are pivotally connected to a pair of side plates 75, disposed adjacent each side of the center pole, about a pivot axis 74. The side plates 75, as will be discussed in detail below, are rigidly connected to the molded base 24. Thus, rotation of the crossbar 65 about the pivot axis 74 will cause the lower toggle links 60 to pivot about the pivot axis 63.

The operating arms 64 are provided with cam surfaces 76. These cam surfaces 76 allow for the mechanical coupling of the contact arms 42 to the operating mechanism 55. More specifically, each of the contact arms 42 are provided with a slot 78 for receiving a cam roller pin 80. The cam roller pin 80 extends outwardly from the sides of the contact arm 42. Cam rollers 82 are received on each end of the cam roller pin 80. The cam rollers 82 cooperate with the cam surfaces 76 to mechanically couple the contact arms 42 to the operating mechanism 55. In all conditions except a blown open condition, the cam rollers 82 are captured in a pocket 83 formed in the cam surfaces 76. In a blown open condition, the cam rollers 82 are displaced out of the pockets 83 by the magnetic repulsion forces to uncouple the operating mechanism 55 from the contact arm assembly 42. This allows the contact arms 42 to open independently of the operating mechanism 55 as a result of magnetic repulsion forces. Biasing springs 84, coupled between the cam roller pin 80 and the pivot axis 74, provide contact pressure which must be overcome by the magnetic repulsion forces in order to allow the contact arm 42 to be blown open. More specifically, in the closed condition, since the cam rollers 82 are not quite seated in the pockets 83, but rather, are located slightly adjacent and upward of the pocket 83, the contact arm 42 is urged in a counterclockwise direction (FIG. 2) by the biasing springs 84, which produces a contact pressure between the main contacts 32.

The upper toggle links 58 are pivotally connected to a cradle assembly 86 about a pivot axis 88. More specifically, the upper toggle links 58 are provided with a U-shaped notch 89 at one end. A pivot pin 90, is supported by the cradle assembly 86. The pivot pin 90 is captured by the U-shaped notch 89 to define a pivotal connection about the pivot axis 88. The cradle assembly 86 is pivotally connected to the side plates 75 about a pivot axis 97.

The cradle assembly 86, which will be discussed in more detail below, is provided with a latch surface 92. The latch surface 92 cooperates with the latch mechanism 54 on the electronic trip unit 51. More particularly, when the latch surface 92 is latched, operating springs 93, connected between the pivot axis 62 and operating handle arm 94, bias the operating mechanism 55 to cause the upper toggle links 58 and the lower toggle links 60 to be disposed colinearly with respect to each other when the main contacts 32 are closed. In response to an overcurrent condition, the latch mechanism 54 on the electronic trip unit 51 releases the latch surface 92 provided on the cradle assembly 86. The operating springs 93 then cause the cradle assembly 86 to rotate in a counterclockwise direction (FIG. 2) about the pivot axis 97 which causes the toggle assembly 56 to collapse. This causes the operating arms 64 and the attached crossbar 65 to rotate in a clockwise direction, thereby rotating the contact arms 42 and separating the main contacts 32, if the cam rollers 82 are captured in the pockets 83 in the cam surface 76.

The circuit breaker 20 can also be manually turned off by rotating an insulated operating handle 95, mechanically coupled to the handle arm 94, in a clockwise direction to the open position. This causes the toggle assembly 56 to collapse, which allows the contact arm 42 to rotate upwardly under the influence of the operating springs 93.

The handle arm 94 is formed as a U-shaped member having two depending arms 98. The free ends 102 of the depending arms 98 are provided with notches 104 for capturing a pivot pin 106. The pivot pin 106 is carried by V-shaped notches 107 provided in the side plates 75. In the closed and tripped positions of the circuit breaker 20, the pivot pin 106 is captured in a pocket 109 defined by the V-shaped notch 107. In the open position, the pivot pin 106 is disposed adjacent the pocket 109. In this condition the toggle assembly 56 is collapsed. More specifically, the lower toggle links 60 are disposed clockwise relative to their position in a closed or an open position. Similarly, the upper toggle links 58 are disposed counterclockwise relative to their position in closed or on position.

Once the latch surface 92 on the cradle assembly 86 has been disengaged from the latch mechanism 54 on the electronic trip unit 51, it is necessary to reset the operating mechanism 55. This is accomplished by rotating the operating handle 95 in a clockwise direction until the latch surface 92 on the cradle assembly 86 engages the latch mechanism 54 on the electronic trip unit 51.

A reset pin 108, carried by the operating handle 95, is captured in notches 110, provided in the upper portion of the depending arms 98 of the U-shaped handle arm 94 when the insulated handle 95 is rotated clockwise. The reset pin 108, in turn, engages a reset surface 114 provided on the cradle assembly 86. Further rotation of the operating handle 95 causes the cradle assembly 86 to rotate clockwise until the latch surface 92 on the cradle assembly 86 engages and latches the latch mechanism 54 on the electronic trip unit 51.

SCREW ADJUSTABLE CLINCH JOINT WITH BOSSES

An important aspect of the invention relates to the pivotally mounted contact arm 42 formed as a clinch joint. The clinch joint defines the pivotal connection between the contact arm 42 and the load conductor assembly 44. The pivotal connection eliminates the need for woven copper wire or laminated shunt assemblies used in known circuit breakers.

A critical aspect of the invention relates to the ability to control the contacting surfaces between the contact arm 42 and the pivot bracket 46 in order to control the friction and the electrical resistance of these surfaces. These two factors need to be controlled because of their effect on the performance of the circuit breaker 20. More specifically, the electrical resistance has to be controlled to control the current flow through the assembly. Also, the friction between the contacting surfaces has to be controlled since an excessive amount of friction could slow down the opening of the main contacts 32.

The contact arm 42 is a bifurcated assembly formed from two coextensive irregular shaped arms 115, joined together at one end 116. The other end 118 of the arms 115 is bent outwardly forming spaced apart arm portions 119. The spaced apart arm portions 119 receive the pivot bracket 46. Aligned apertures 122 in the arms 115 are aligned with an aperture 124 in the pivot bracket 46. A pivot pin 125, received in the apertures 122 and 124, provides a pivotal connection between the contact arm 42 and the pivot bracket 46 about the pivot axis 74. The pivot bracket 46 is electrically connected to the load conductor base 48.

In order to control the contact surfaces between inner surfaces 128 of the contact arm 42 and the pivot bracket 46, bosses 130 are provided on the pivot bracket 46, concentric with the aperture 124. These bosses 130 are provided on each side of the pivot bracket 46 and extend outwardly therefrom. The bosses 130 may be coated with silver to provide a relatively smooth contacting surface. These bosses 130 provide a relatively uniform contact surface between the pivot bracket 46 and the inner surfaces 128 of the contact arm 42 in order to allow the friction and the electrical resistance of the joint to be controlled.

Aligned apertures 132, provided in the spaced apart arm portions 119, receive a clinch screw 134. Wave washers 136 are disposed about a shank portion of the clinch screw 134 at one end. The clinch screw 134 is secured at the end opposite a head portion by a nut or other fastener causing the wave washers 136 to be captured between the head portion of the clinch screw 134 and an outer surface 137 of the contact arm 42. The clinch screw 134 and the wave washers 136 allow the friction between the inner surfaces 128 of the contact arm 42 and the bosses 130 to be controlled.

Slots 78 are provided in the spaced apart arm portions 119 of the contact arm 42 to receive the cam roller pin 80 as discussed above. The biasing springs 84, connected between the cam roller pin 80 and the pivot pin 74, bias the cam roller pin 80 within the slot 78.

The above assembly allows the current from the contact arm 42 to be transferred from the contact arm 42 to the bosses 130 and into the load side conductor base 48 by way of the pivot bracket 46 without the use of laminated or woven copper wire shunts.

TAPERED STATIONARY CONTACT LINE COPPER

Another important aspect of the invention relates to a line side conductor 37 which carries the rigidly mounted main contact 34. More specifically, the line side conductor 37 is provided as a generally rectangular shaped member having a generally U-shaped slot 138 defining two conducting leg portions 144 and 146 and a peninsula portion 148 having two oppositely disposed edges 149 and 150. The edges 149 and 150 of the peninsula portion 148 are tapered outwardly toward the base 151 of the peninsula portion 148 to provide for a larger cross-sectional area of the conductor to provide better current density and heat dissipation. The tapered edges 149 and 150 also allow the cross-sectional area of the peninsula portion 148 to be made substantially equivalent to the cross-sectional area of the conducting leg portions 144 and 146.

The U-shaped slot 138 in the line side conductor 37 is for receiving a slot motor (not shown) and also to form a portion of the magnetic repulsion loop to allow the main contacts 32 to be blown open during relatively high level overcurrent conditions. In known devices, the opposing edges of the peninsula portion are not tapered. This can result in undesirable temperature increase of line side conductor because of the decrease in the overall cross-sectional area. This undesirable heat must be dissipated by other means, such as by providing a larger size conductor. By utilizing a line side conductor configuration as in the present invention, the overall cross-sectional area of the conductor is increased which results in better current density and heat dissipation without utilizing a relatively larger size line side conductor.

Figure 6:
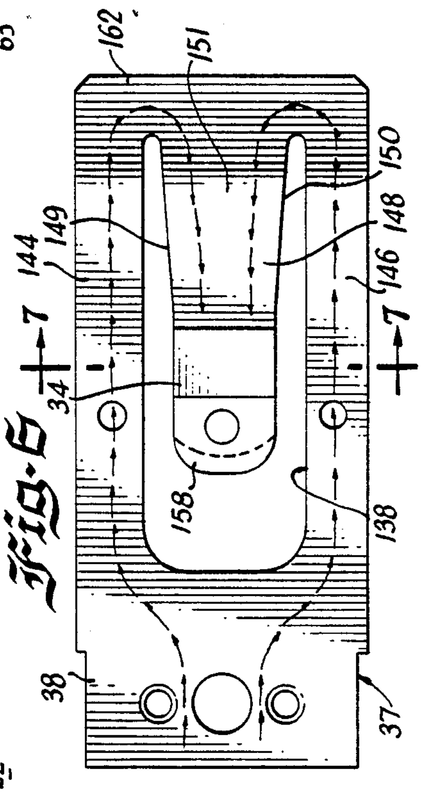
FIG. 6 is a plan elevation view of a line conductor in accordance with the present invention.
Figure 5:
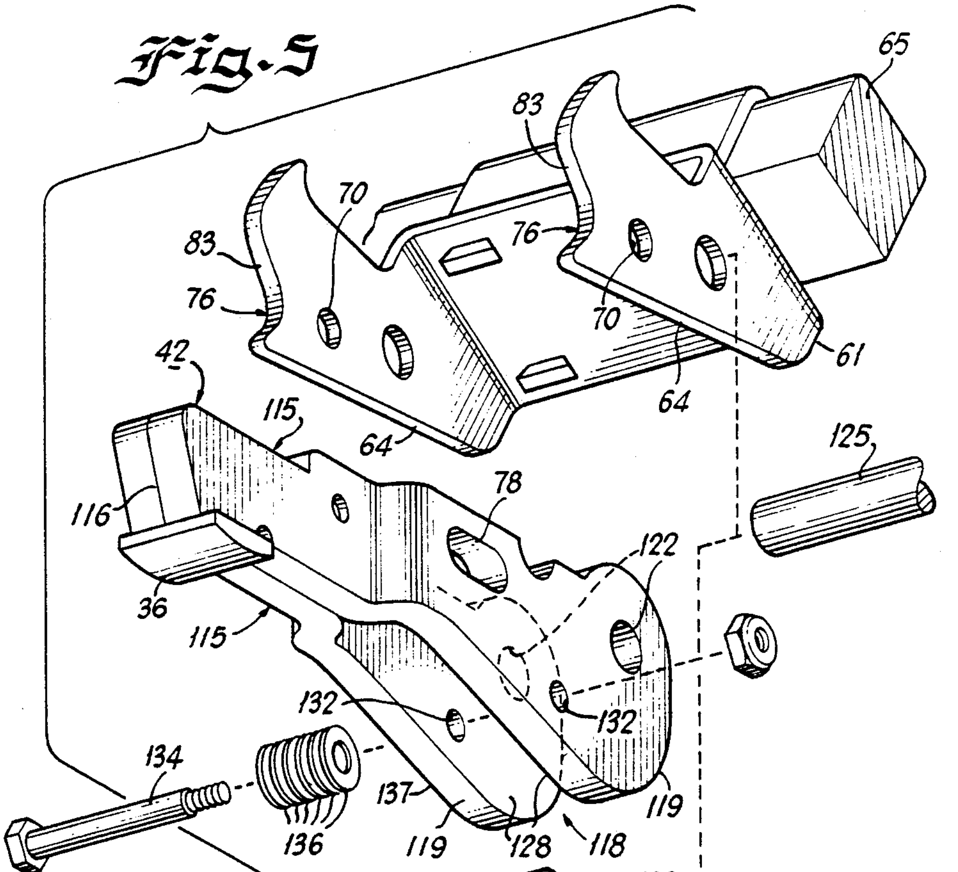
FIG. 5 is an exploded perspective view of some of the components of the circuit breaker in accordance with the present invention.
Figure 5:
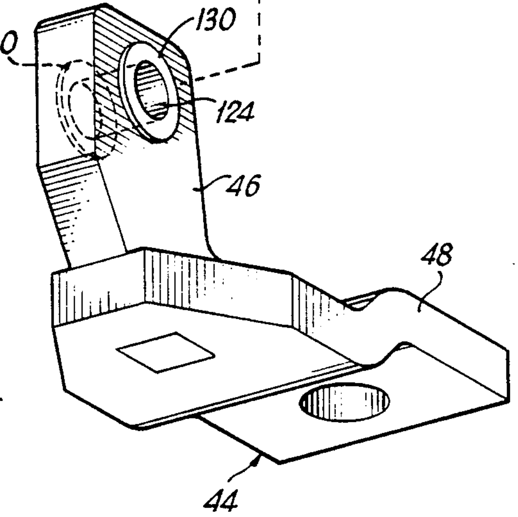
Figure 4:
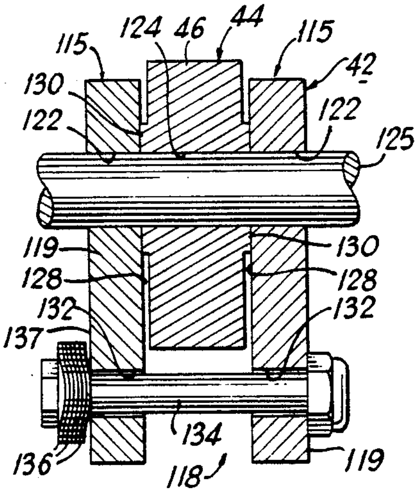
FIG. 4 is an enlarged sectional view taken along line 4—4 of FIG. 2.
Figure 8:
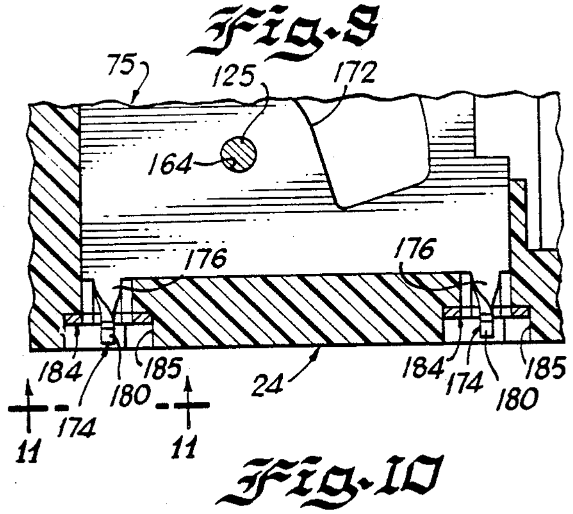
FIG. 8 is a partial cross-sectional view taken along line 8—8 of FIG. 3.
Figure 9:
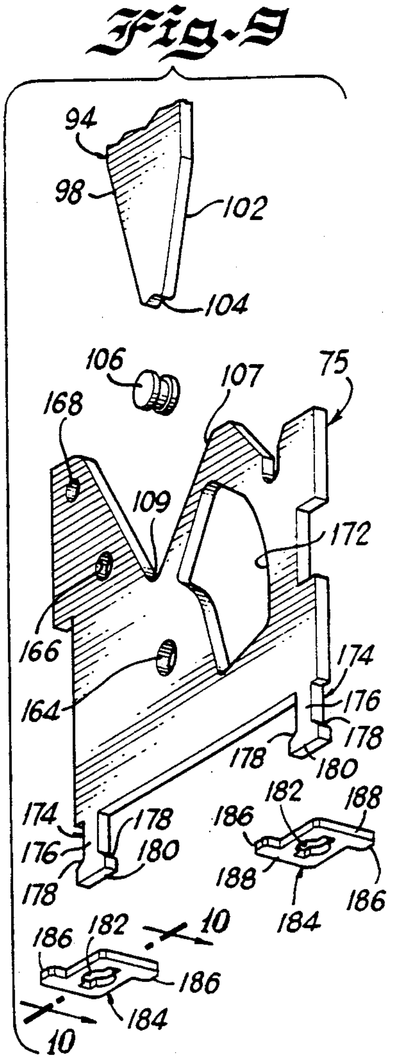
FIG. 9 is an exploded perspective view of the side plates in accordance with the present invention and some of the components associated therewith.
Figure 10:
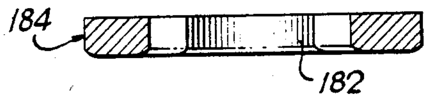
FIG. 10 is an enlarged cross-sectional view taken along line 10—10 of FIG. 9 showing the spin plate in accordance with the present invention.
Figure 11:
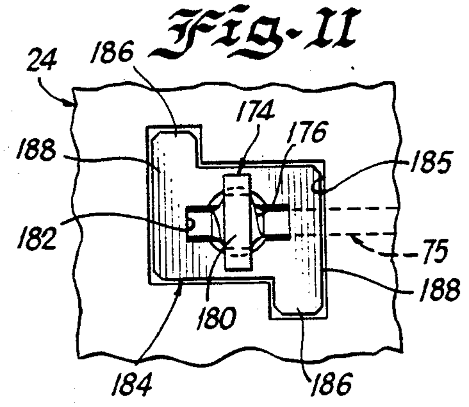
FIG. 11 is a bottom elevation view taken along line 11—11 of FIG. 8.
Figure 12:
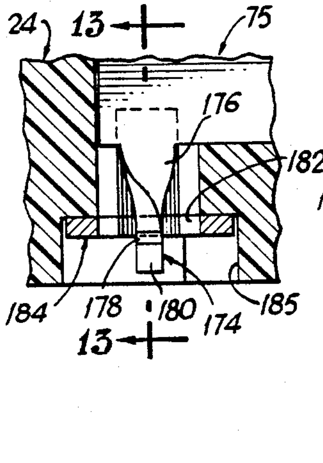
FIG. 12 is an enlarged view of FIG. 8.
Figure 13:
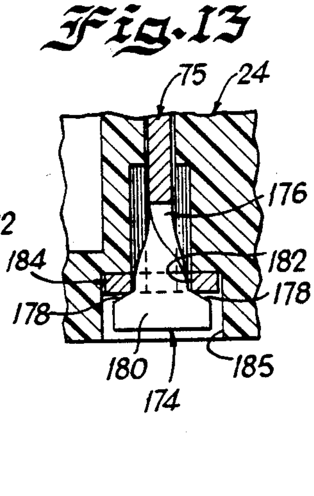
FIG. 13 is a cross-sectional view taken substantially along line 13—13 of FIG. 12.
Figure 14:
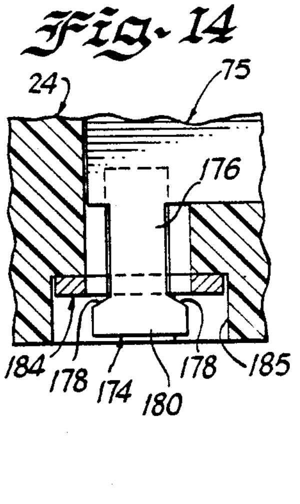
FIG. 14 similar to FIG. 12 but illustrates twist tabs in accordance with the present invention before twisting.

As discussed above, one of the functions of the U-shaped slot 138 is to form a magnetic repulsion loop. This is accomplished by causing the current in the line conductor 37 to flow in a direction opposite to the direction of current flow in the contact arm 42. More specifically, the line side conductor 37 contains an electrical terminal portion 38 to allow connection between an external electrical circuit and the rigidly mounted main contact 34. The current applied to the line side terminal portion 38 flows in the direction of the arrows shown in FIG. 6. This current is divided up between conducting leg portions 144 and 146 as shown in FIG. 6. This current in the leg portions 144 and 146 flows together in the peninsula portion 148 in a direction opposite that in the conducting leg portions 144 and 146. As best shown in FIG. 2, the current which flows through the movable main contact 36 in the contact arm 42 is in an opposite direction relative to the direction of current flow in the peninsula portion 148. Thus, during relatively high level overcurrent conditions, the opposing currents develop magnetic repulsion forces which cause the main contacts 32 to be blown open by causing the contact arm 42 to be rotated in a clockwise direction.

The other function of the U-shaped slot 138 is to receive a slot motor. The slot motor assists the contacts 32 blowing open. More particularly, the slot motor, consisting either of a series of generally U-shaped steel laminations encased in electrical insulation or of a generally U-shaped, electrically insulated solid bar, is received in the U-shaped slot 138, adjacent the main contacts 32. The slot motor concentrates the magnetic field generated upon a relatively high level overcurrent condition to increase the magnetic repulsion forces between the peninsula portion 148 and the contact arm 42. This rapidly accelerates the separation of the main contacts 32 which results in a relatively high arc resistance which limits the magnitude of the fault current.

The rigidly mounted main contact 34 is securely fastened to the peninsula portion 148. An arc runner 158 is disposed adjacent the main contact 34 to allow the arc to travel into arc shoots 160. The arc shoots 160 are used to divide a single electrical arc, formed as a result of the separating main contacts 32, into a series of electrical arcs thereby increasing the total arc voltage which results in a limiting of the magnitude of the fault current.

Another important aspect of the line side conductor 37 relates to the means for providing adequate electrical separation between the line side conductor 37 and the contact arm 42 when the main contacts 32 are separated. More specifically, one side 162 of the line side conductor 37 is tapered downwardly. This is done to provide more separation between the line side conductor 37 and the contact arm 42 when the main contacts 32 are separated since these two points are at different potentials.

SIDE PLATE TAPERED TWIST TAB FASTENING DEVICE FOR FASTENING SIDE PLATES TO THE BASE

Another important aspect of the invention relates to the means for fastening the side plates 75 to the molded base 24. The side plates 75 are used to support a portion of the operating assembly 55 of the circuit breaker 20. More specifically, these side plates 75 are disposed adjacent the center pole and are used to provide various functions. For example, aligned apertures 164 in the side plates 75 define the pivot axis 74 for the crossbar 65. Another pair of aligned apertures 166 define the pivot axis 97 for the cradle assembly 86. Another set of aligned apertures 168 receive a stop pin 170 to limit counterclockwise rotation of the cradle assembly 86 during tripping of the contacts. A V-shaped notch 107 in the side plates 75 captures the pivot pin 106 for the handle arm 94. Lastly, an irregular slot 172 allows the crossbar 65 to rotate about the pivot axis 74.

In known circuit breakers, the side plates 75 are connected to the molded base 24 by various means, such as tabs extending downwardly from the bottom edge with threaded ends, spun over ends or staked ends, received in apertures or load bearing plates in the molded base 24.

In other known circuit breakers, downwardly extending twist tabs are provided having straight shank portions and enlarged head portions. These twist tabs are received by slots disposed in spin plates carried in the underside of the base. The twist tabs are twisted to secure the side plates to the base. In this design, it is necessary to control the length of the shank portions of the twist tabs relatively closely in order to avoid play in the side plates 75 after the twist tabs are twisted, which may affect the operation of the operating mechanism.

The twist tabs 174, provided in accordance with the present invention, extend downwardly from the bottom edge of the side plate 75 and are formed with shank portions 176, a tapered portion defining a sloped surface 178 and a head portion 180. The twist tabs 174 are received in slots 182, provided in a generally rectangular spin plate 184, carried in a cavity 185 formed in the underside of the molded base 24. Once the twist tabs 174 are twisted, the spin plate 184 is captured in the molded base 24.

The sloped surfaces 178 contact the slots 182 in the spin plates 184. As the twist tab 174 is twisted, the shank portion 176 becomes shorter thereby drawing a wider portion of the sloped surface 178 into engagement with the slot 182 to provide a secure connection between the side plates 75 and the molded base 24.

Since the spin plates 184 are stamped, they are configured to be received in the cavity 185 in the underside of the molded base 24 such that any rough edges on the break side resulting from the stamping process are not in engagement with the sloped surfaces 178. More particularly, as a result of the stamping process one side of the spin plate 184 is relatively smooth while the break side of the spin plate 184 may contain burrs. In order to prevent improper orientation of the break side with respect to the molded base 24, the spin plate 184 is keyed so that it can only be received such that the break side contacts the underside of the molded base 24. This is accomplished by providing means for indexing the spin plate 184. The indexing means include extending finger portions 186 disposed generally parallel to each other on diametrically opposite corners 188 of the spin plate 184.

TWO PIECE CRADLE LATCH FOR CIRCUIT BREAKER

Another important aspect of the present invention relates to the two piece cradle assembly 86 comprising a U-shaped cradle portion 190 and an L-shaped heat treated portion 192. The heat treated portion 192 includes a latch surface 92 and a reset surface 114. Because of the wear on these parts, they are generally heat treated. However, due to the complicated shape of cradle portion 190 having bends in many different directions, heat treating these portions can cause the cradle to become brittle and distort. Accordingly, the cradle assembly 86, provided in accordance with the present invention, is formed from a two piece assembly wherein only the wear surfaces, such as the latch surface 92 and the reset surface 114 are heat treated. The cradle portion 190 and the heat treated portion 192 may be fastened together with rivets 194 or other suitable fasteners to form the cradle assembly 86.

The cradle portion 190 is integrally formed from two spaced apart, parallel cradle shaped arms 196 joined together at one end by a connecting portion 198 disposed substantially perpendicular to the cradle-shaped arms 196. A first pair of aligned apertures 200 is provided in the cradle shaped arms 190 which define the pivot axis 90 for the cradle assembly 86 with respect to the side plates 75. A second pair of aligned apertures 202, provided in the cradle shaped arms 196, define the pivot axis 97 between the upper toggle links 58 and the side plates 75.

The connecting portion 198 joins the cradle shaped arms 196 together. Apertures 203 are provided in the connecting portion 198 for receiving the rivets 194 to allow the heat treated portion 192 to be fastened thereto. The attachment of the heat treated portion 192 to the connecting portion 198 also serves to reinforce the connecting portion 198.

The heat treated portion is an integrally formed piece which defines the latch surfaces 92 and the reset surface 114. Because the heat treated portion is not as complicated as the cradle portion 190 and does not contain as many bends in different directions, it is less likely to distort as a result of the heat treating.

Another important aspect of this invention is that the heat treated portion 192 is formed such that the engaging portions of the latch surface 92 and the reset surface 114 are flat, smooth surfaces to distribute the load. The use of the flat, smooth surfaces also reduces the friction between the components.

Obviously many modifications and variations of the present invention are possible in light of the above teachings. Thus,it is to be understood that, within the scope of the appended claims, the invention may be practiced otherwise than as specifically described hereinabove.

What is claimed and desired to be secured by a Letters Patent is:

1. A circuit breaker including a housing, a molded base having an aperture, an operating mechanism, a pair of separable main contacts and a pair of side plates for carrying a portion of said operating mechanism, said side plates including means for attachment to said molded base comprising:

one or more twist tabs extending downwardly from a bottom edge of said side plate, each twist tab having a shank portion, an enlarged head portion and a tapered portion therebetween; and one or more spin plates, each spin plate having a slot for receiving said tapered portion of said twist tabs and adapted to be disposed adjacent said molded base such that said slot is aligned with said aperture.

2. A circuit breaker as recited in claim 1 wherein said spin plates are stamped members defining a smooth side and a rough side.

3. A circuit breaker as recited in claim 2 further including means for indexing said spin plates such that said spin plates can only be disposed with respect to said base such that the smooth side contacts the tapered portion.

4. A circuit breaker as recited in claim 3 wherein said molded base is formed with cavities for receiving said spin plates.

5. A circuit breaker as recited in claim 3 wherein said spin plates are generally rectangular members.

6. A circuit breaker as recited in claim 5 wherein said indexing means includes one or more extending fingers.

7. A circuit breaker as recited in claim 5 wherein the number of extending fingers is two.

8. A circuit breaker as recited in claim 7 wherein said fingers are disposed on diametrically opposite corners on said spin plate.

9. A circuit breaker as recited in claim 7 wherein said fingers are disposed generally parallel to each other.

10. A method of securing a side plate to a base of a circuit breaker, said base having an aperture, comprising the steps of:

(a) providing extending twist tabs on said bottom edge of said side plate, said twist tabs having a head portion, a shank portion and a tapered portion therebetween;

(b) providing a spin plate having a slot for receiving said twist tab;

(c) disposing said spin plate adjacent said base such that said slot is aligned with said aperture (d) inserting said twist tab into said aperture and said slot such that said tapered portion contacts the surface of said slot; and (e) twisting said tab until said side plate is secured to the base.

11. A method as recited in claim 10 wherein said spin plate is a stamped member having a smooth side and a rough side, further including the step of:

(f) providing indexing on said spin plate such that said smooth side contacts said tapered portion.

* * * * *